Aug. 8, 1961 R. P. BURR 2,995,620

COLOR TELEVISION-SIGNAL CONVERSION APPARATUS

Filed June 27, 1955 2 Sheets-Sheet 2

2,995,620
COLOR TELEVISION-SIGNAL CONVERSION APPARATUS

Robert P. Burr, Huntington, N.Y., assignor to Hazeltine Research, Inc., Chicago, Ill., a corporation of Illinois
Filed June 27, 1955, Ser. No. 518,162
10 Claims. (Cl. 178—5.4)

This invention is directed to television-signal conversion apparatus for converting one type of television signal into another. More specifically, though not limited thereto, the invention is directed to apparatus for converting color-television signals representative of primary colors which have been, for example, field sequentially developed into color-television signals representative of the same primary colors which are simultaneous rather than sequential.

The characteristics of an NTSC color-television signal now standard are well known. This color-television signal, in addition to conventional signal components corresponding to those of a monochrome signal, includes a subcarrier wave signal modulated at different phases by signals representative of primary colors of a televised image. In one type of camera equipment for developing an NTSC type of color signal, the signals representative of the primary colors are simultaneously developed by means of, for example, three cameras and are simultaneously utilized either directly or indirectly to modulate the subcarrier wave signal at the different phases. Though the NTSC color-television signal including the modulated subcarrier wave signal is preferable to a field-sequential or line-sequential type of signal, the type of camera equipment utilizing three cameras for developing such signal is not only expensive but has other deficiencies. The multiplicity of cameras introduces problems of adequate registry of the images from the three cameras, bulkiness of camera equipment, and undesirably increases the number of camera personnel. There is also a lack of camera maneuverability and portableness. The operations of the program director or television broadcast engineer monitoring the signals developed by the three cameras become extremely complex in effecting scene selection, fading from one scene to another, utilizing split screens, and performing similar duties.

Recently, equipment known as the Chromacoder has been described in an article entitled "Chromacoder Colorcasting" in the December, 1954 issue of Radio-Electronics Engineering at pages 7–9, inclusive, 34, and 35 and is now being manufactured to provide a solution for some of the above-mentioned problems. The Chromacoder utilizes a field-sequential type of camera, that is, for example, a conventional monochrome type of camera with modified scanning speeds and video-frequency pass-band circuits cooperating with a rotating color filter positioned in front of the camera lens to develop, sequentially, signals representative of the three primary colors. A camera of this type is relatively simple, provides high-quality color signals, has no registry problems, and is portable and highly maneuverable. In fact, such a camera has all the desirable features of a monochrome camera and few, if any, of the deficiencies of a three camera system such as described above. The signals developed in the camera are field-sequential signals representing the conventional 525 lines in a frame occurring at the unconventional field rate of 180 fields per second. Benefits of operation at this rate are minimizing of color fringing of active televised subjects and color flicker. Conversion apparatus is employed to convert these signals into simultaneous signals representing the same number of lines with a field rate of 60 per second and suitable for transmission and utilization in accordance with the color-television standards. In the conversion apparatus, the sequentially developed signals are utilized in three picture tubes to develop separate green, red, and blue images at the high field rate of 180 per second. The images developed in the picture tubes are then individually scanned by three camera-type tubes at the lower field rate of 60 per second to develop three simultaneous color signals. The simultaneous color signals are then utilized in a conventional manner in an NTSC type of transmitter.

Through the utilization of the field-sequential camera in the manner described above provides the many advantages mentioned, the process of employing the signals developed by the camera initially to reproduce primary color images which are then scanned by additional camera tubes to develop the desired simultaneous color signals is not only complex but tends to degrade the quality of the information developed by the field-sequential camera. The well-known problems arising from phosphor deficiencies, nonlinear responses of picture and camera tubes, brightness limitations, registry, spurious patterns, and many allied problems are introduced. One very serious problem is the cascading of optical apertures. An improved sequential-to-simultaneous signal converter is desired for cooperation with a field-sequential camera to retain the high quality of the color signals available from the camera and is provided in accordance with the present invention.

It is, therefore, an object of the present invention to provide a new and improved television-signal conversion apparatus which does not have the deficiencies and limitations of prior such apparatus.

It is a further object of the present invention to provide a new and improved television-signal conversion apparatus for converting field-sequential color signals into simultaneous color signals.

It is also an object of the present invention to provide a new and improved television-signal conversion apparatus for converting simultaneous color signals into field-sequential color signals.

It is a still further object of the present invention to provide a new and improved television-signal conversion apparatus for converting color signals having one time relationship into other color signals having a different time relationship.

In addition, it is an object of the present invention to provide a new and improved color-television signal-conversion apparatus which is relatively stable in operation, simple, and inexpensive.

In accordance with the present invention, a television-signal conversion apparatus comprises means for supplying a plurality of color-television signals having a specific time relationship and individually representative of different component colors of an image. The apparatus also comprises means including a plurality of recording devices, at least one for each of the color signals, individually responsive to different ones of these signals and recording material coupled to the recording devices. In addition, the apparatus includes means for effecting movement of the recording material with respect to each of the recording devices at a predetermined speed for recording on the material effects representative of the color-television signals. Finally, the apparatus including a plurality of signal pickup devices coupled to the recording material and means for effecting movement of the recording material with respect to each of the pickup devices at a speed other than the aforementioned predetermined speed for converting the recorded effects into a plurality of color-television signals having another time relationship.

For a better understanding of the present invention, together with other and further objects thereof, reference is had to the following description taken in connection with the accompanying drawings, and its scope will be pointed out in the appended claims.

Referring to the drawings.

Figure 1:
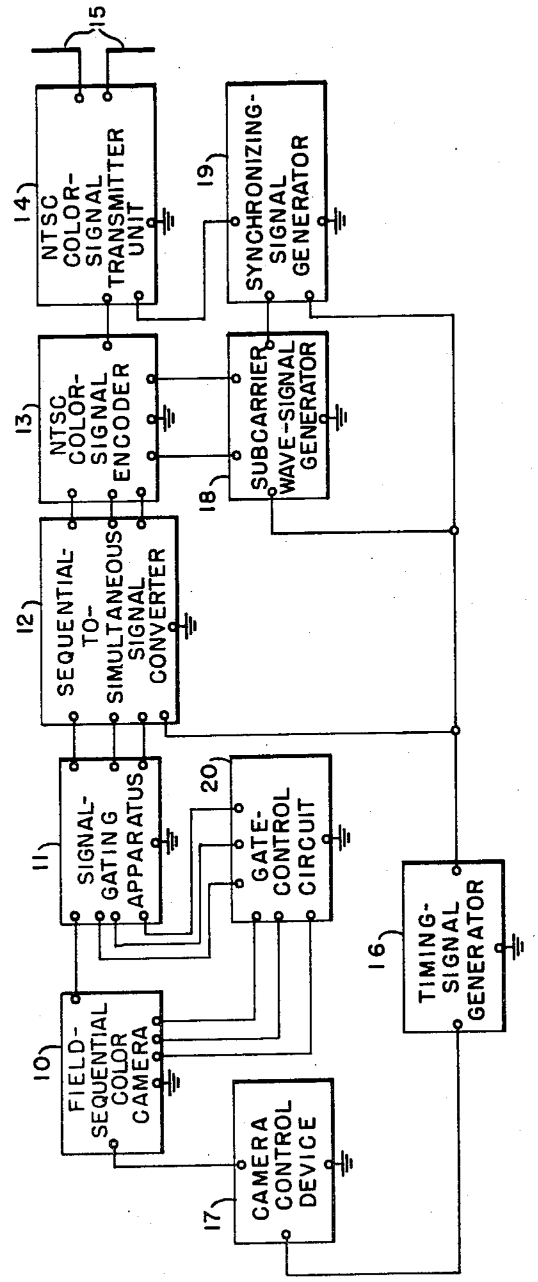
FIG. 1 represents schematically a color-television transmitter utilizing television-signal conversion apparatus in accordance with the present invention.

*General description and explanation of transmitter of FIG. 1*

Considering now FIG. 1, the transmitter there represented includes, in cascade in the order named, a field-sequential color camera 10, signal-gating apparatus 11, a sequential-to-simultaneous signal converter 12 in accordance with the present invention and to be described more fully hereinafter with respect to FIG. 2, an NTSC color-signal encoder 13, and an NTSC color-signal transmitter unit 14. The output circuit of the unit 14 is coupled to an antenna 15. The camera 10 may be a conventional field-sequential type employing a rotating color filter such as, for example, described in the aforementioned article in Radio-Electronics Engineering. NTSC color-signal encoders are well known in the color-television art for developing the standard NTSC color-television signal from a group of simultaneous color signals representative of color primaries. One type of suitable encoder is fully described in an article entitled, "The Colorplexer—A Device for Multiplexing Color Television Signals in Accordance with the NTSC Signal Specifications," in the January, 1954 issue of the Proceedings of the I.R.E. at pages 204–212, inclusive.

The transmitter of FIG. 1 also includes control equipment for controlling the operation of the aforementioned apparatus. More specifically, the transmitter includes a timing-signal generator 16 for developing a reference timing signal. One output circuit of the generator 16 is coupled through a camera control device 17 to control circuits in the camera 10. The device 17 may be of a conventional type for developing line-synchronizing, field-synchronizing, and blanking pulses for utilization in the camera 10 to control the operation of the rotating color filter and the deflection of the electron beam to develop the desired field-sequential color-television signals. The line frequency may be, for example, approximately 47.250 kilocycles while the field frequency is, for example, approximately 180 cycles per second. Another output circuit of the generator 16 is coupled to an input circuit of the signal converter 12, for reasons to be explained more fully hereinafter, to an input circuit of a subcarrier wave-signal generator 18, and to a synchronizing-signal generator 19. The subcarrier wave-signal generator 18 is conventional equipment for an NTSC type of color-television transmitter and, as described in the aforementioned I.R.E. article, develops a pair of subcarriers each having an frequency of approximately 3.58 megacycles which is utilized in the encoder 13 as a composite carrier signal for color-signal components. The synchronizing-signal generator 19 is also conventional in NTSC types of transmitters for developing the standard line-synchronizing, field-synchronizing, and color burst synchronizing signals.

In addition, the transmitter of FIG. 1 includes a gate-control circuit 20 coupled between the camera 10 and the signal-gating apparatus 11. The gate-control circuit may have any of a number of designs one of which is considered in the aforementioned article in Radio-Electronics Engineering. For example, it may comprise one pulse-developing circuit for each of the primary colors with each of these pulse-developing circuits being coupled to a source in the camera 10 of a signal representing one of the color fields. This source may be a commutator on the shaft of the rotating color filter or may be electronically coupled to the field-synchronizing circuits. The pulse-developing circuits in the unit 20 are triggered in sequence in phase with the different color fields to develop pulses which control the conductivity of, for example, three amplifiers in the apparatus 11 which have common input circuits coupled to the camera 10 and separate output circuits. Different color signals representative of the three color fields are developed in the separtae output circuits.

Considering now the operation of the transmitter of FIG. 1, the field-sequential camera 10 develops, in sequence, fields of signals representative of the red, green, and blue component colors of the televised subject. These fields of signals are applied, in sequence, to the apparatus 11 wherein the sequential conduction of the three amplifiers, each conducting in phase with different ones of the fields, develops different ones of the three color signals in separate output circuits. The three sequential signals in the separate output circuits of the unit 11 are applied to the unit 12 wherein they are converted, in a manner to be explained more fully hereinafter, to simultaneous signals representative of the primary colors of the televised image. The simultaneous signals are encoded in the unit 13, in a well-known manner, to develop a standard NTSC type of color-television signal and the latter signal is transmitted by the unit 14.

The generator 16 develops a master reference signal which is utilized in the control device 17 to develop synchronizing control signals for the camera 10. The rotation of the color filter in the camera 10 develops, by means of, for example, photocell lamps or properly positioned brushes cooperating with a commutator ring or by other conventional means, the pulses representative of the different fields of color which are utilized by the units 20 and 11. The master signal developed in the timing generator 16 is also utilized in the generator 18 to develop the NTSC subcarrier wave signal and in the generator 19 to develop the line-frequency, field-frequency, and color burst synchronizing pulses.

Figure 2:
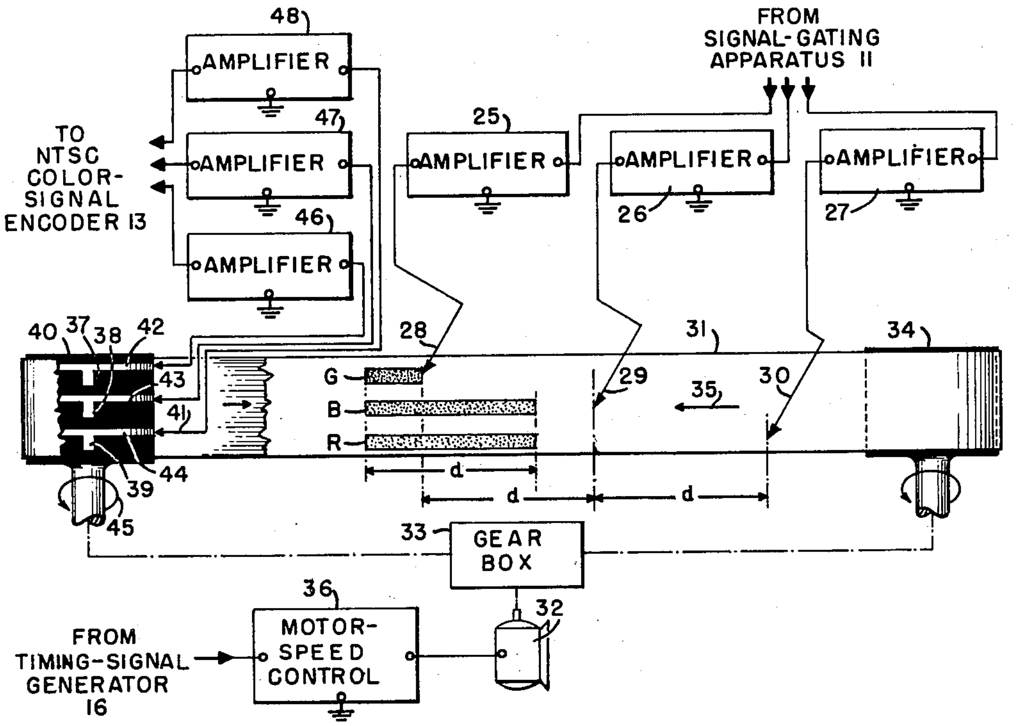
FIG. 2 represents schematically, in more detail, a television-signal conversion apparatus such as utilized in the transmitter of FIG. 1.

*Description of television-signal conversion apparatus of FIG. 2*

Considering now more particularly the television-signal conversion apparatus 12, one embodiment thereof is represented in FIG. 2. The apparatus of FIG. 2 includes means for supplying a plurality of color-television signals having a specific time relationship and individually representative of different component colors of an image. More specifically, such means comprises amplifiers 25, 26, and 27 having input circuits coupled to the signal-gating apparatus 11 of FIG. 1 for supplying field-sequential signals representative of red, green, and blue fields.

The apparatus also comprises means including a plurality of recording devices, at least one for each of the color signals, individually responsive to different ones of the color signals and further including recording material coupled to the recording devices. More specifically, such means includes a recorder having a plurality of stationary recording heads, specifically, heads 28, 29, and 30 coupled, respectively, to the output circuits of the amplifiers 25, 26, and 27. The recording heads may be conventional magnetic heads such as, for example, utilized in well-known tape-recording equipment except that each head is designed to operate over a wide frequency range, for example, substantially over the range of 0–12 megacycles. The heads are staggered with respect to each other along the path of a tape 31 for reasons to be explained more fully hereinafter. In addition, the recorder includes recording material, specifically, the magnetic tape 31 having separate recording tracks for the three recording heads. Though a single wide tape is represented, three separate tapes, one for each of the recording heads, can be employed. The tape 31 is a closed loop and is, for example, approximately 6 feet long.

The apparatus also includes means for effecting movement of each of the recording devices with respect to corresponding ones of the recording tracks at a predetermined speed for recording on the tracks, in accordance with the aforementioned time relationship, effects representative of the color-television signals. More specifically, the latter means includes a motor 32 mechanically coupled through a gear box 33 to the shaft of a drive pulley 34. The recording tape 31 is in friction contact with the pulley 34 so as to be driven by such pulley in the direction of the arrow 35 and past the stationary recording heads 28, 29, and 30. A motor-speed control 36 is coupled between an output circuit of the timing-signal generator 16 and a speed-control circuit of the motor 32 to control the operation of the motor.

Figure 3:
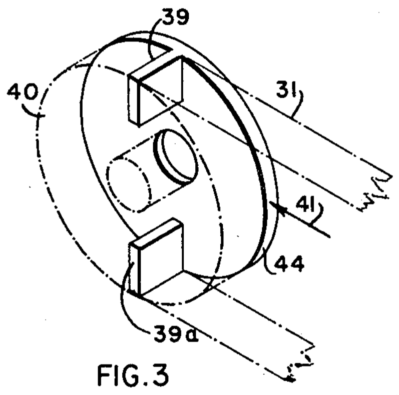
FIG. 3 is a side elevational view of one of the pickup devices of the apparatus of FIG. 2.

The apparatus also includes a plurality of signal pickup devices, at least one coupled to each of the recorded tracks, specifically, pickup heads 37, 38, and 39 mounted as integral parts of a pulley 40 and electrically coupled to commutator rings 42, 43, and 44, respectively. The heads 37, 38, and 39 are aligned so as to contact the separately recorded tracks on the tape 31 at the same time in order simultaneously to develop signals therefrom. A perspective side elevational view of one of the pickup devices is represented in FIG. 3. In FIG. 3, the pickup head 39 is represented in contact with the tape 31 and electrically connected to the metallic commutator ring 44 mounted on the surface of the pulley 40. The ring 44 is preferably slightly recessed with respect to the surface by a few thousandths of an inch, in order not to contact the tape, and cooperates with a brush 41 to collect and translate the signal information developed by the head 39. Though only one pickup head is needed for each recorded signal, as will be explained hereinafter when considering the operation of the converter, it is benefiical to have a pair of pickup heads each operating one-half the time. Therefore, another head 39*a* diametrically opposite the head 39 is represented in FIG. 3 and is also electrically coupled to the commutator ring 44. Each of the pickup devices on the pulley 40 may be arranged in the manner represented by FIG. 3.

Finally, the signal-conversion apparatus includes means for effecting movement of each of the pickup devices with respect to the recording material at a speed other than the aforementioned predetermined speed for converting the recorded effects into a plurality of color-television signals having another time relationship. More specifically, the latter means includes the motor 32 and the gear box 33 mechanically linked to a shaft of the pulley 40 to cause the pulley 40 to rotate in the direction indicated by the arrow 45. At least in a converter for converting sequential-to-simultaneous signals, the pulley 40 rotates at a speed slower than the speed of the tape 31 around such pulley so that the pickup heads 37, 38, and 39 pick up information at a rate slower than the recording rate of the recording devices 28, 29, and 30. If, for example, a sequential field rate of 180 cycles per second, a tape rate of 90 feet per second, and a simultaneous field rate of 60 per second are employed, the circumferential speed of the pulley 40 is two-thirds that of the tape or 60 feet per second resulting in a differential tape speed of 30 feet per second with respect to the pickup heads on the pulley 40. Since the pulley 40 travels one-half a revolution in one-sixtieth of a second in order for the pickup heads to scan a field one-half a foot long while the scanned field moves at a rate of 30 feet per second with respect to the pulley, one-half the circumference of the pulley is 1 foot and the circumference is 2 feet. The pickup heads 37, 38, and 39 are coupled individually through respective amplifiers 46, 47, and 48 to input circuits of the NTSC color-signal encoder 13.

Though not shown, a signal-erasing head of conventional type and extending across the width of the tape may be positioned on the far side of the tape loop in order to provide a clean tape free of recorded signals at the recording heads 28, 29, and 30.

*Operation of television-signal conversion apparatus of FIG. 2*

With some differences which will become obvious hereinafter, the apparatus of FIG. 2 operates in a manner similar to that of conventional tape-recording apparatus except for the speed of operation and the frequency range of the recorded information. Of necessity, because of the high video frequencies involved, the tape speed in the apparatus of FIG. 2 is many times the highest speed used for recording audio signals, for example, of the order of 90 feet per second.

In the apparatus of FIG. 2, the tape 31 is driven by the pulley 34 which is powered by the motor 32 through mechanical linkages and one set of gears in the gear box 33. The tape 31 is endless, moving in the direction represented by the arrow 35 and passing over pulleys 34 and 40, and, as the tape moves past the recording heads 28, 29, and 30, information is recorded thereon. The pickup heads 37, 38, and 39 collect the recorded information as the tape slips over the surface of the pulley 40. The process of recording and the process of collecting the recorded information are so related as to convert sequentially developed signals into simultaneous signals.

The recording heads 28, 29, and 30 are staggered with respect to each other. The spacing *d* between these heads along the tape path is equal to the velocity of the tape times the duration of one sequential field. To record the range of frequencies involved, the tape should have a speed of approximately 90 feet per second and, if each sequential field has a duration of $\frac{1}{180}$ of a second, the spacing between recording heads is approximately one-half a foot. The exact spacing is adjusted during operation to effect parallel recording of the sequential fields of signals. By staggering the heads 28, 29, and 30 with such specific spacing therebetween, the sequential fields may be sequentially recorded and the recorded information will appear in parallel relation on parallel tracks of the tape. More specifically, as the initial portion of the information representative of the red field recorded by the recording head 30 appears opposite the recording head 29, the recording process for the red field is completed by the recording head 30 and the recording process for the next field, for example, the blue field, is started on the parallel adjacent track by the recording head 29. Consequently, the recorded information representative of the red and blue fields is in parallel areas on the tape. Similarly, the information representative of the green field recorded by the recording head 28 will be in an area parallel to the areas for the information representative of the red and blue fields. In the field-sequential type of operation under consideration, where each field has a duration of $\frac{1}{180}$ of a second, the recording process for the three fields in sequence takes $\frac{3}{180}$ of a second or one-sixtieth of a second.

The duration of each NTSC color-television field is one-sixtieth of a second, the three fields representative of the three primary colors having simultaneous durations. The field-sequential and simultaneous systems are similar in that a complete set of three fields requires one-sixtieth of a second in both systems but differ in that each field in the simultaneous system takes three times as long as the corresponding field in the sequential system. Therefore, to develop simultaneous fields from the sequential fields the collection by the heads 37, 38, and 39 of recorded information representative of each sequential field should require three times the period needed to record such information. This slower collection speed is obtained by having the tape 31 driven by the pulley 34 slip past the pulley 40 while the latter pulley is rotated in the same direction as the pulley 34 but at two-thirds the speed of the pulley 34. The resultant difference in velocity between the tape 31 and the pulley 40 and, consequently, between the tape 31 and the pickup heads 37, 38, and 39 is one-third the velocity of the tape 31 with respect to the stationary recording heads 28, 29, and 30. Consequently, the signals developed by the pickup heads 37, 38, and 39 are simultaneous fields of red, green, and blue of the televised image, each having a duration of one-sixtieth of a second. The simultaneous signals are utilized in the NTSC television encoder 13 in the same manner as signals developed by a three camera NTSC camera system are conventionally utilized.

In collecting the recorded information the pulley 40 and the heads 37, 38, and 39 rotate only one-half a cycle and the heads are then at the bottom of the pulley 40. With these heads in such position the next group of recorded signals, representative of the successive series of fields, appears at the top of the pulley 40 in position to have the recorded information collected. This collection can take place by employing two diametrically disposed pickup heads for each recorded track, as represented by the heads 39 and **39*a* of FIG. 3, coupled to the same output circuit or by having a single head, such as the head 39, mechanically mounted on the pulley 40** in such manner as to be triggered back to the top of the pulley after rotating to the bottom. Though it is practicable to use one pickup head for each track, it is preferable to use a pair of such heads.

The accuracy with which the signals are converted depends on the maintenance of precise relationships between the spacings of the recording heads, the tape speed, the proper phasing of the pickup heads to the recorded material, and the speed of the pulley 40 as well as on the stability of length of the tape and constancy of size of the pulleys 34 and 40. The precision required is directly related to the area of a recorded picture element on the tape 31, that is, of the order of 0.012 mil. However, the use of a continuous loop of recording tape and the same motor for the two speeds minimizes the problem of speed control and the tolerances required are well within conventional practice. If desired, the proper speed can be obtained by recording a speed-control track on the tape and utilizing a pickup head to derive a signal from the track, the frequency of the derived signal defining the speed of the tape. Any deviation from proper frequency can then be utilized to adjust the speed of the motor 32.

From the above description and explanation of the color-television signal-conversion apparatus of FIG. 2 it should be apparent that many variations in the manner of recording and collection of the information representative of the three fields may be utilized. For example, though in the above description and explanation the recording heads 28, 29, and 30 have been described as staggered and stationary while the pickup heads 37, 38, and 39 have been described as parallel and moving, it will be clear to those skilled in the art that the heads 28, 29, and 30 may move while the heads 37, 38, and 39 are stationary and the heads 28, 29, and 30 may be positioned parallel with respect to each other while the heads 37, 38, and 39 are staggered. In all such arrangements, the conversion of field-sequential signals to simultaneous signals can be effected in accordance with the invention. In addition, though the pulley 40 has been described as including the pickup heads 37, 38, and 39 as integral parts thereof, in a more elaborate arrangement assuring more precise relative speed of the tape 31 and pulley 40 a separate pulley rotating at the same speed as the tape might be employed with the pickup heads mounted on an additional rotating member coaxial with the pulley 40 but rotating at a slower speed than the pulley 40.

Figure 4:
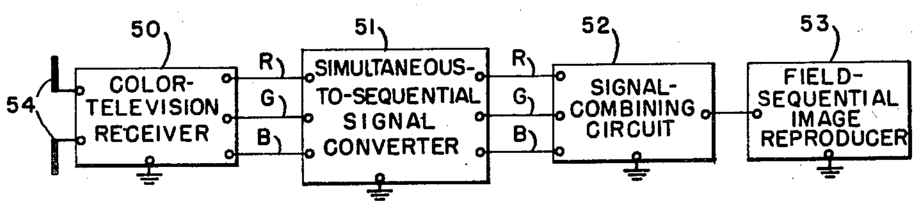
FIG. 4 represents schematically a color-television receiver utilizing color-television signal-conversion apparatus in accordance with the present invention.

*Television-signal conversion apparatus of FIG. 4*

The novel television-signal conversion apparatus in accordance with the invention has been described with respect to FIGS. 1 and 2 as being employed to convert field-sequential signals having a high field rate to simultaneous signals having a lower field rate. It may at times be desirable to perform the inverse conversion, that is, to convert simultaneous signals of low field rate to field-sequential signals having a high field rate. For example, in receiver projection equipment it may at times be preferable to utilize field-sequential signals in a single projection picture tube cooperating with a rotating disc to reproduce a color image. Such conversion can be effected by means of apparatus similar to that described with reference to FIG. 2.

Referring now to the receiver of FIG. 4, there are represented in cascade in the order named a color-television signal receiver 50, a simultaneous-to-sequential signal converter 51, a signal-combining circuit 52, and a field-sequential image reproducer 53. The input circuit of the receiver 50 is coupled to an antenna 54. The receiver 50 may comprise conventional superheterodyne circuits for providing an NTSC video-frequency signal including conventional simultaneous red, green, and blue signals. The circuit 52 combines sequential red, green, and blue signals into one signal-translating channel and the reproducer 53 may comprise a conventional field-reproducing system.

The converter 51 may be physically the same as the converter of FIG. 2 differing from the latter converter by having the recording and pick-up heads interchanged. Simultaneous red, green, and blue signals having a low field rate of, for example, one-sixtieth of a second are utilized as input signals while sequential red, green, and blue signals having a high field rate of, for example, 1/180 of a second are developed in the output circuits. Preferably, though this change is not essential, the pulleys 34 and 40 of the apparatus in FIG. 2 are interchanged. The simultaneous red, green, and blue signals are then applied to recording heads on the repositioned pulley 40 simultaneously to record parallel tracks of signals representative of the red, green, and blue fields at the low field rate of one-sixtieth of a second. The heads 28, 29, and 30, now the pickup heads, develop the signals representative of red, green, and blue fields in sequence at the desired high field rate of 180 a second.

Synchronization of the operation of the reproducer 53 with that of the televising equipment may be effected by any of a number of procedures. For example, the line- and field-frequency synchronizing signals can be recorded with the fields for the three colors and converted to the higher frequency synchronizing signals by the operation of the converter 51. Another process would be to use the line- and field-frequency synchronizing signals to control the speed and phase of operation of the converter 51 and use a separate tripler circuit to triple the frequency of these synchronizing signals for use in the reproducer 53.

Though the conversion apparatus described herein has been considered specifically with respect to conversion of one type of color signal to another, it will be apparent to those skilled in the art that similar apparatus in accordance with the invention may also be used when television signals of either monochrome or color developed in accordance with one set of standards are to be converted into other television signals of either monochrome or color having another set of standards. For example, in Europe where the different countries have different sets of standards, broadcasts between countries can be effected by using apparatus such as described herein. This conversion can be made at either line or field rate. Also, though the conversion apparatus described herein records fields representative of red, green, and blue, fields representative of any other set of color-defining elements may be utilized if the photographic filters in the camera and phosphors or filters in the picture tube can utilize the elements.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Color-television signal-conversion apparatus comprising: means for supplying a plurality of color-television signals having a specific time relationship and individually representative of different component colors of an image; means including a plurality of recording devices, at least one for each of said signals, individually responsive to different ones of said signals and recording material coupled to said devices; means for effecting movement of said recording material with respect to each of said recording devices at a predetermined speed for recording on said material effects representative of said color-television signals; a plurality of signal pickup devices coupled to said recording material; and means for effecting movement of said recording material with respect to each of said pickup devices at a speed other than said predetermined speed for converting said recorded effects into a plurality of color-television signals having another time relationship.

2. Color-television signal-conversion apparatus comprising: means for supplying in sequence a plurality of color-television signals individually representative of different component colors of an image; means including a plurality of recording devices, at least one for each of said signals, individually responsive to different ones of said signals and recording material coupled to said devices; means for effecting movement of said recording material with respect to each of said recording devices at a predetermined speed for recording on said material in said sequence effects representative of said color-television signals; a plurality of signal pickup devices coupled to said recording material; and means for effecting movement of said recording material with respect to each of said pickup devices at a speed slower than said predetermined speed for converting said recorded effects into a plurality of simultaneous color-television signals.

3. Color-television signal-conversion apparatus comprising: means for supplying a plurality of field-sequential color-television signals individually representative of different component colors of an image; means including a plurality of recording devices, at least one for each of said signals, individually responsive to different ones of said signals and recording material coupled to said devices; means for effecting movement of said recording material with respect to each of said recording devices at a predetermined speed for recording on said material effects representative of said color-television signals; a plurality of signal pickup devices coupled to said recording material; and means for effecting movement of said recording material with respect to each of said pickup devices at a speed slower than said predetermined speed for converting said recorded effects into a plurality of simultaneous color-television signals.

4. Color-television signal-conversion apparatus comprising: means for supplying three field-sequential color-television signals individually representative of the red, green, and blue component colors of an image and having a field rate of approximately 180 a second; means including three recording devices individually responsive to different ones of said signals and recording material coupled to said devices; means for effecting movement of said recording material with respect to each of said recording devices at a predetermined speed for recording on said material effects representative of said color-television signals; a plurality of signal pickup devices coupled to said recording material; and means for effecting movement of said recording material with respect to each of said pickup devices at a speed one-third said predetermined speed for converting said recorded effects into a plurality of simultaneous color-television signals having a field rate of approximately 60 a second.

5. Color-television signal-conversion apparatus comprising: means for supplying a plurality of simultaneous color-television signals individually representative of different component colors of an image; means including a plurality of recording devices, at least one for each of said signals, individually responsive to different ones of said signals and recording material coupled to said devices; means for effecting movement of said recording material with respect to each of said recording devices at a predetermined speed for recording on said material effects representative of said color-television signals; a plurality of signal pickup devices coupled to said recording material; and means for effecting movement of said recording material with respect to each of said pickup devices at a speed faster than said predetermined speed for converting said recorded effects into a plurality of field-sequential color-television signals.

6. Color-television signal-conversion apparatus comprising: means for supplying a plurality of color-television signals having a specific time relationship and individually representative of different component colors of an image; means including a plurality of recording devices, at least one for each of said signals, individually responsive to different ones of said signals and a closed loop of recording material coupled to said devices; means for effecting movement of said recording material with respect to each of said recording devices at a predetermined speed for recording on said material effects representative of said color-television signals; a plurality of signal pickup devices coupled to said recording material; and means for effecting movement of said recording material with respect to each of said pickup devices at a speed other than said predetermined speed for converting said recorded effects into a plurality of color-television signals having another time relationship.

7. Color-television signal-conversion apparatus comprising: means for supplying a plurality of field-sequential color-television signals individually representative of different component colors of an image; means including a plurality of recording devices, at least one for each of said signals, individually responsive in sequence to different ones of said signals and recording material coupled to said devices, said devices being staggered with respect to each other along said material; means for effecting movement of said recording material with respect to each of said recording devices at a predetermined speed for recording on parallel tracks of said material effects representative of said color-television signals; a plurality of parallel signal pickup devices coupled to said recording material; and means for effecting movement of said recording material with respect to each of said pickup devices at a speed slower than said predetermined speed for converting said recorded effects into a plurality of simultaneous color-television signals.

8. Color-television signal-conversion apparatus comprising: means for supplying a plurality of color-television signals having a specific time relationship and individually representative of different component colors of an image; tape-recording means including a plurality of magnetic recording heads, at least one for each of said signals, individually responsive to different ones of said signals and magnetic tape coupled to said heads; means for effecting movement of said tape with respect to each of said recording heads at a predetermined speed for recording on said tape effects representative of said color-television signals; a plurality of signal pickup heads coupled to said tape; and means for effecting movement of said tape with respect to each of said pickup heads at a speed other than said predetermined speed for converting said recorded effects into a plurality of color-television signals having another time relationship.

9. Color-television signal-conversion apparatus comprising: means for supplying three field-sequential color-television signals individually representative of the red, green, and blue component colors of an image and having a field rate of approximately 180 a second; tape-recording means including three magnetic recording heads individually responsive to different ones of said signals and a closed loop of magnetic tape coupled to said heads, said heads being staggered with respect to each other along said tape; means for effecting movement of said tape with respect to each of said recording heads at a predetermined speed for recording in parallel areas of parallel tracks of said tape effects representative of said color-television signals; a plurality of parallel signal pickup heads coupled to said tape; and means for effecting movement of said tape with respect to each of said pickup heads at a speed one-third said predetermined speed for converting said recorded effects into a plurality of simultaneous color-television signals having a field rate of approximately 60 a second.

10. Television-signal conversion apparatus comprising:

means for supplying a television signal having a specific line and field rate; tape-recording means including a recording head responsive to said signal and recording tape coupled to said head; means for effecting movement of said recording tape with respect to said recording head at a predetermined speed for recording on said tape effects representative of said signal; a signal pickup head coupled to said recording tape; and means for effecting movement of said recording tape with respect to said pickup head at a speed other than said predetermined speed for converting said recorded effects into a signal having at least a different field rate.

References Cited in the file of this patent

UNITED STATES PATENTS 2,587,005 Smith ---------------- Feb. 26, 1952